US009192880B2

(12) United States Patent  
Mickan et al.

(10) Patent No.: US 9,192,880 B2  
(45) Date of Patent: Nov. 24, 2015

(54) TOROIDAL FILTER VESSEL SYSTEM

(75) Inventors: Mark Mickan, Hockley, TX (US); Carl Hahn, Sugar Land, TX (US); Shane Conrad, Conroe, TX (US)

(73) Assignee: Porous Media Corporation, St. Paul, MN (US)

( * ) Notice: Subject to any disclaimer, the term of this patent is extended or adjusted under 35 U.S.C. 154(b) by 513 days.

(21) Appl. No.: 13/555,997

(22) Filed: Jul. 23, 2012

(65) Prior Publication Data

US 2013/0020248 A1 Jan. 24, 2013

Related U.S. Application Data

(60) Provisional application No. 61/510,248, filed on Jul. 21, 2011.

(51) Int. Cl.
*B01D 29/52* (2006.01)
*B01D 35/30* (2006.01)

(52) U.S. Cl.
CPC .............. *B01D 29/52* (2013.01); *B01D 35/30* (2013.01); *B01D 2201/02* (2013.01); *B01D 2201/0446* (2013.01)

(58) Field of Classification Search
None
See application file for complete search history.

(56) References Cited

U.S. PATENT DOCUMENTS

| 420,136 | A | * | 1/1890 | Willis | 210/323.2 |
|---|---|---|---|---|---|
| 3,524,548 | A | * | 8/1970 | McDonald et al. | 210/153 |
| 3,814,261 | A | * | 6/1974 | Morgan, Jr. | 210/453 |
| 4,298,474 | A | | 11/1981 | Sillers, Jr. | |
| 4,407,664 | A | | 10/1983 | Sillers, Jr. | |
| 4,436,621 | A | | 3/1984 | Picker | |
| RE31,966 | E | | 8/1985 | Sillers, Jr. | |
| 4,613,438 | A | | 9/1986 | DeGraffenreid | |
| 4,904,380 | A | | 2/1990 | Bhanot et al. | |
| 5,069,786 | A | | 12/1991 | Pulek | |
| 5,505,842 | A | | 4/1996 | Enderle | |
| 5,611,924 | A | | 3/1997 | Osborne | |
| 6,080,219 | A | | 6/2000 | Jha et al. | |
| 6,773,485 | B2 | | 8/2004 | Doubrava et al. | |
| 6,861,003 | B2 | | 3/2005 | Backman et al. | |
| 6,953,124 | B2 | | 10/2005 | Winter et al. | |
| 7,112,234 | B2 | | 9/2006 | Jha et al. | |
| 2005/0178734 | A1 | | 8/2005 | Kilmer et al. | |
| 2007/0170104 | A1 | * | 7/2007 | Belford et al. | 210/295 |
| 2007/0251876 | A1 | | 11/2007 | Krogue et al. | |
| 2008/0099408 | A1 | | 5/2008 | Swindell et al. | |
| 2009/0321339 | A1 | * | 12/2009 | Suzuki et al. | 210/233 |

FOREIGN PATENT DOCUMENTS

| GB | 2132504 | 7/1984 |
|---|---|---|
| JP | 11197424 | 7/1999 |
| JP | 200300964 | 10/2000 |

* cited by examiner

*Primary Examiner* — Benjamin Kurtz
(74) *Attorney, Agent, or Firm* — Quarles & Brady LLP

(57) ABSTRACT

Embodiments of the invention provide a filter vessel including a housing with an inlet and an outlet, a toroidal-shaped inlet manifold, and a plurality of inlet channels. The toroidal-shaped inlet manifold is in fluid communication with the inlet and is positioned along a circumference of the housing, and the plurality of inlet channels are in fluid communication with the toroidal-shaped inlet manifold.

19 Claims, 5 Drawing Sheets

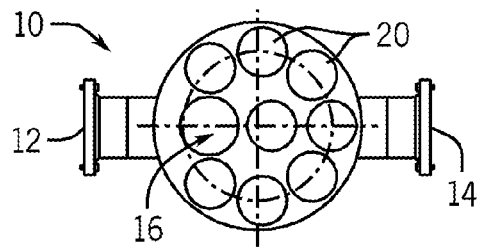 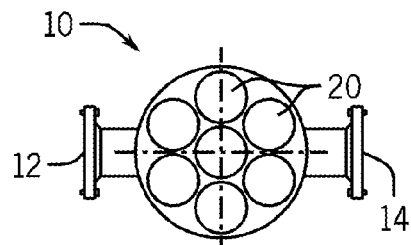
PRIOR ART    PRIOR ART
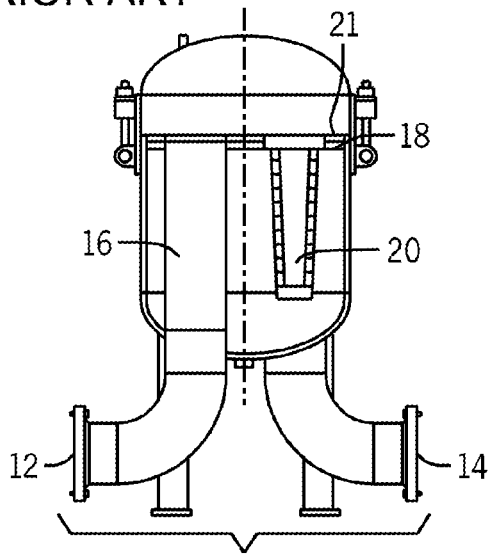 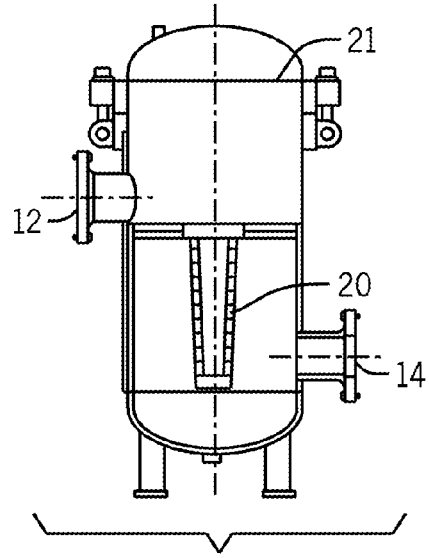
FIG. 1A    FIG. 1B
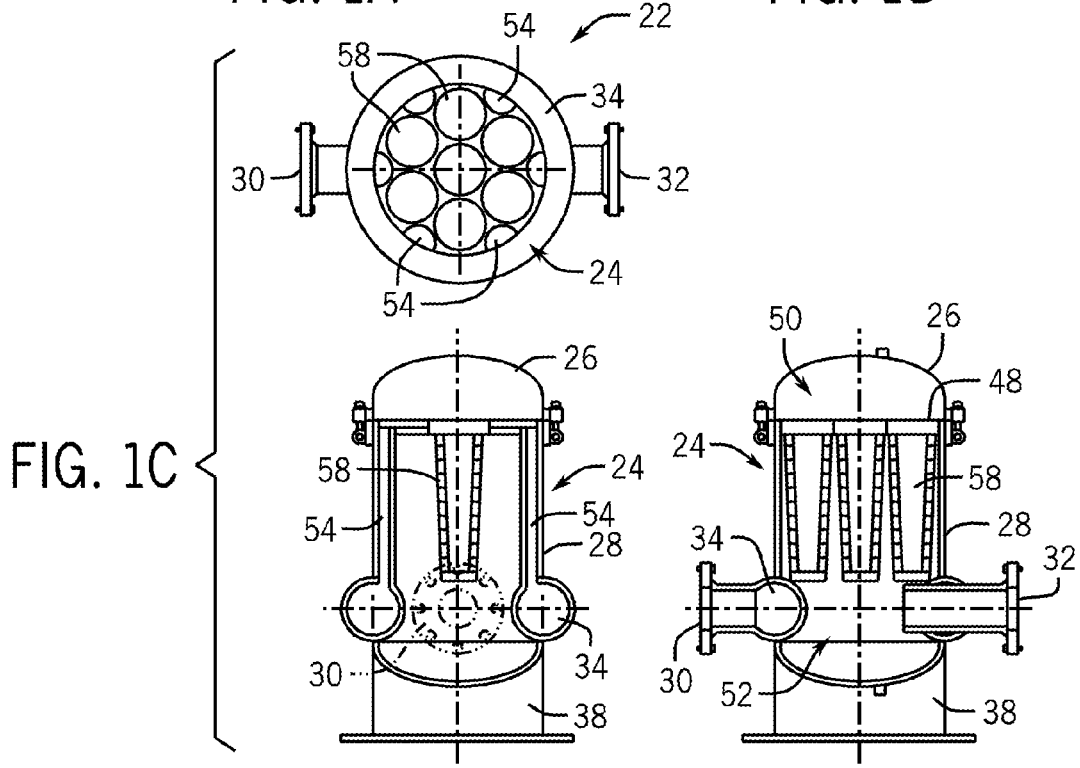
FIG. 1C

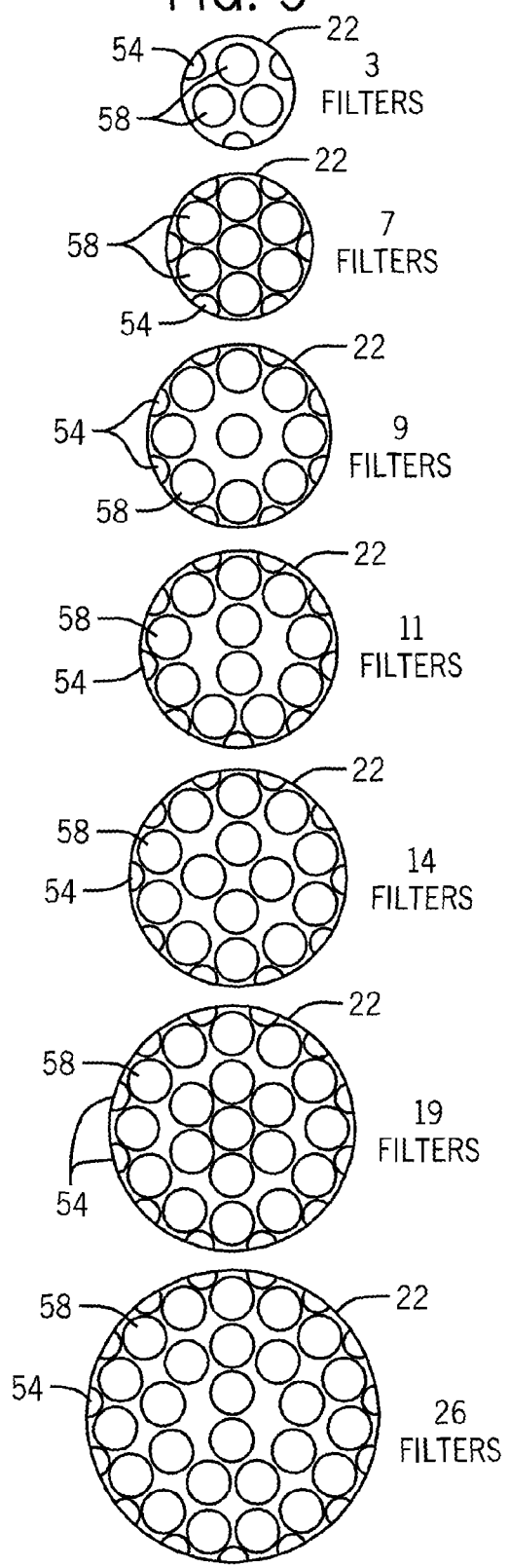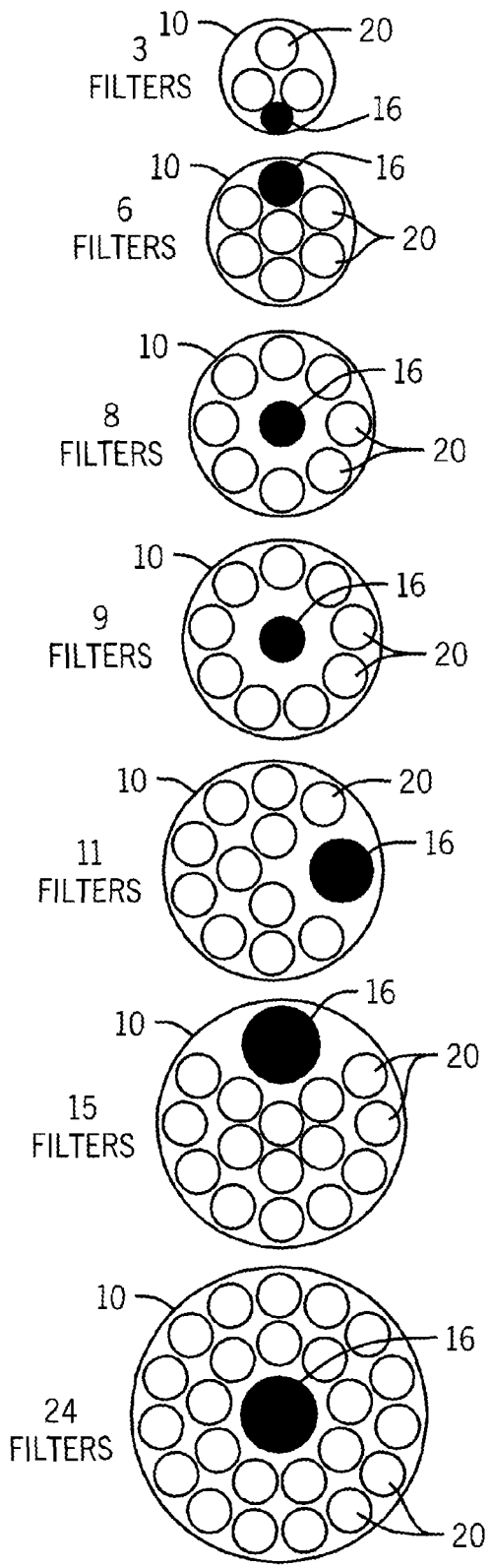

TOROIDAL FILTER VESSEL SYSTEM

RELATED APPLICATIONS

This application claims priority under 35 U.S.C. §119 to U.S. Provisional Patent Application No. 61/510,248 filed on Jul. 21, 2011, the entire contents of which is incorporated herein by reference.

BACKGROUND

Conventional in-line filter vessel designs provide in-line nozzles at the same elevation or at different elevations. As shown in FIG. 1A, a conventional filter vessel 10 with in-line inlet and outlet nozzles 12, 14 positioned at the same elevation allow for a straight line arrangement of the filter vessel 10 within a process or system and requires no deviation of the process piping from its original elevation. Typically, this design requires that an inlet pipe 16 protrude through the tube sheet 18 of the filter vessel 10. Thus, the inlet pipe 16 occupies space which could otherwise be occupied by a filter element 20. As a result of the inlet pipe 16 requiring the displacement of at least one filter element 20, larger filter vessel diameters are needed for a given number of filter elements 20. In small diameter vessels, in particular, this significantly diminishes the filter capacity for a given filter vessel diameter or requires a larger diameter filter vessel 10 to achieve a given capacity, requiring both greater vessel space (which is often at a premium in process designs) and greater fabrication cost. In packaged process systems, minimization of space can be an important design element in terms of minimizing material costs as well as overall system costs. These effects are particularly acute in applications where footprint and/or weight are extremely costly, such as offshore oil and gas production platforms. Depending on the design pressure of the filter vessel 10, a larger vessel diameter may also require a greater shell thickness in order to conform to design codes, further increasing material requirements, vessel weight, and fabrication costs.

FIG. 1B shows a conventional filter vessel 10 with in-line nozzles 12, 14 positioned at different elevations. This can allow maximization of filter elements 20 within the filter vessel 10, but does so at the expense of the nozzle elevation. More specifically, to afford an inlet that does not protrude through the tube sheet 18 and occupy filter space, the inlet nozzle 12 is elevated relative to the outlet nozzle 14. This arrangement requires additional piping complexity (such as elbows and risers) and additional piping space around the filter vessel 10, increasing its overall footprint. Additionally, fabrication code requirements may necessitate spacing between welds, closures, etc., which results in further additional height accommodations. The added height typically does not allow personnel to access the filter elements 20 when standing at grade, necessitating access platforms 19, ladders, etc. (as shown in FIG. 2). Additionally, the vessel design of FIGS. 1B and 2 places the filter elements 20 well below the vessel closure 21. By most process plant safety requirements, placing any part of the body below the vessel closure 21 constitutes a confined space vessel entry, requiring additional safety procedures and insertion of blinds into the process piping. This may add considerable operational burden and time required to replace filter elements 20, diminishing plant productivity. The vessel arrangement also results in a large liquid hold-up volume above the tube sheet 18. In the event that the liquid being filtered is a high value product, this may lead to unacceptable product losses. If the liquid being filtered is hazardous or contains volatile, poisonous components (such as hydrogen sulfide gas), this may lead to significant personnel exposure to dangerous materials when opening the filter vessel.

SUMMARY

Some embodiments of the invention provide a filter vessel including a housing with an inlet and an outlet, a toroidal-shaped inlet manifold, and a plurality of inlet channels. The toroidal-shaped inlet manifold is in fluid communication the inlet and is positioned along a circumference of the housing, and the plurality of inlet channels are in fluid communication with the toroidal-shaped inlet manifold.

Some embodiments of the invention provide a filter vessel including a housing with an inlet and an outlet, and a toroidal-shaped inlet manifold in fluid communication with the inlet and positioned along a circumference of the housing. The filter vessel also includes a tube sheet positioned within the housing and separating an inlet chamber from an outlet chamber, and a plurality of inlet channels in fluid communication with the toroidal-shaped inlet manifold and the inlet chamber to disperse fluid, received by the toroidal-shaped inlet manifold from the inlet, substantially uniformly into the inlet chamber. The filter vessel further includes a plurality of filter elements extending through the tube sheet and providing a path for the fluid dispersed into the inlet chamber across at least one of the plurality of filter elements and into the outlet chamber.

DESCRIPTION OF THE DRAWINGS

FIG. 1A includes top and side cross-sectional views of a conventional inlet manifold with a direct inlet and in-line nozzles at the same elevation.

FIG. 1B includes top and side cross-sectional views of a conventional inlet manifold with a direct inlet and in-line nozzles at different elevations.

FIG. 1C includes top, front, and side cross-sectional views of a filter vessel including a toroidal inlet manifold in accordance with one embodiment of the invention.

FIG. 5 includes top cross-sectional views of filter vessels, according to some embodiments of the invention, of varying diameters.

FIG. 6 includes top cross-sectional views of filter vessels, including conventional inlet configurations, of varying diameters.

DETAILED DESCRIPTION

Figure 2:
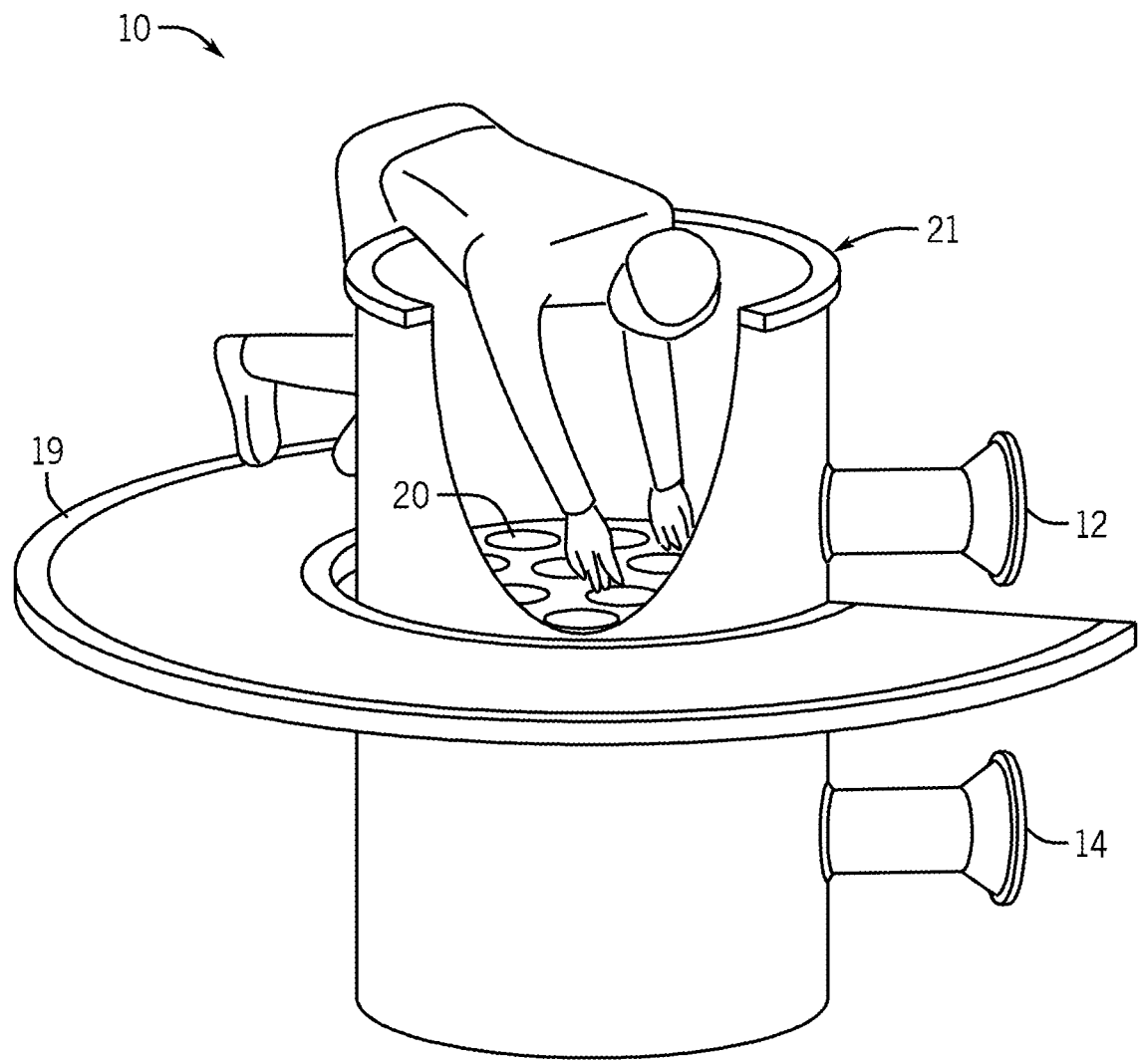
FIG. 2 is a perspective view of a conventional filter vessel design employing in-line inlet and outlet nozzles at different elevations.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 3:
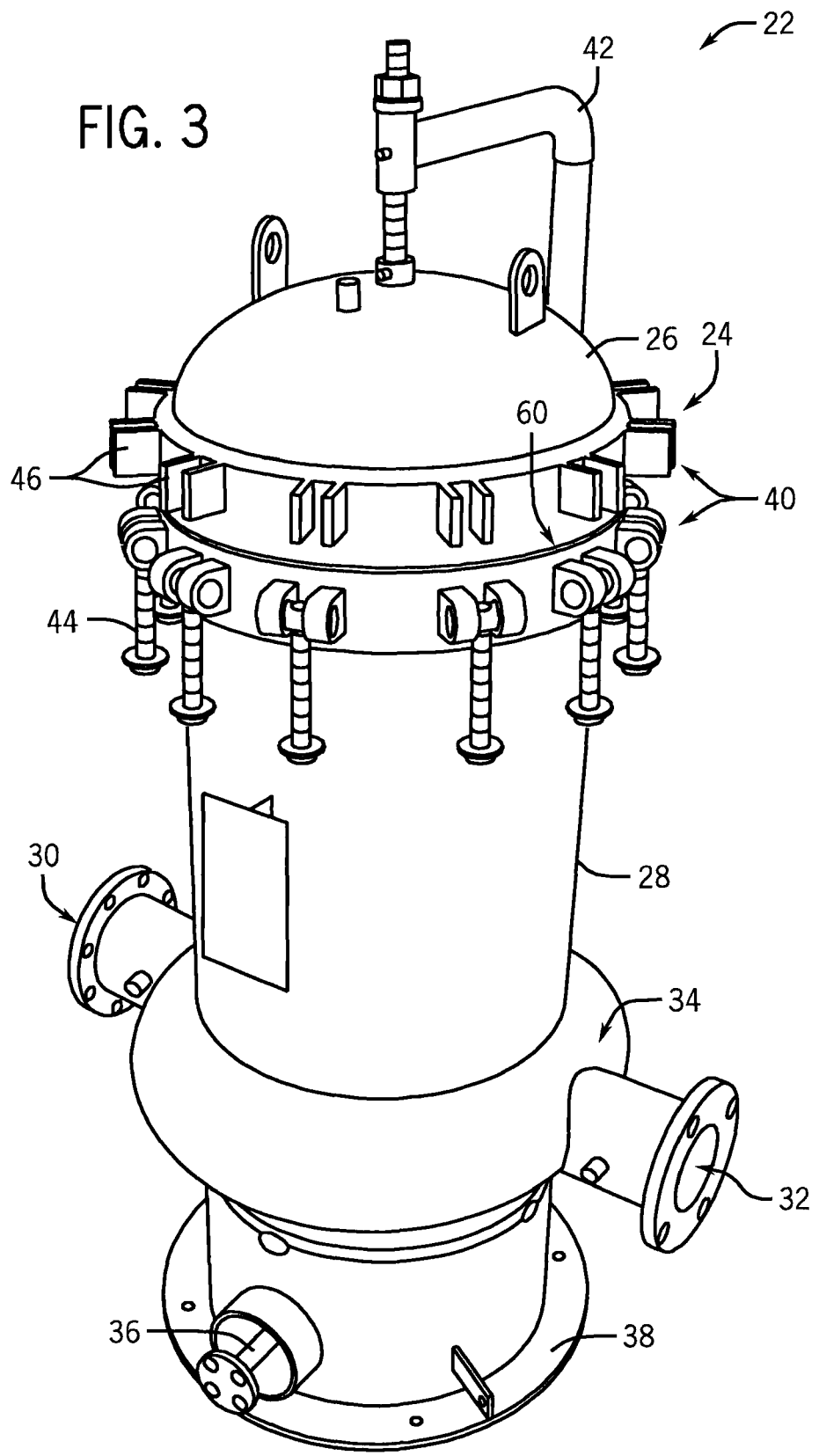
FIG. 3 is a perspective view of a filter vessel according to one embodiment of the invention.

FIG. 3 illustrates a filter vessel 22 according to one embodiment of the invention. The filter vessel 22 can include a housing 24 with an upper housing portion 26 releasably coupled to a lower housing portion 28, an inlet 30, an outlet 32, a toroidal-shaped inlet manifold 34, a drain plug 36, and a base 38. The upper housing portion 26 and the lower housing portion 28 can be releasably coupled together by locking elements 40 and the upper housing portion 26 can be movable relative to the lower housing portion 28 by a hinge 42. The locking elements 40 can include hinged levers 44 coupled to the lower housing portion 28, and receiving elements 46 coupled to or integral with the upper housing portion 26. The hinged levers 44 can be rotated to engage the receiving elements 46, thereby preventing the upper housing portion 26 from being twisted or lifted away from the lower housing portion 28. When the hinged levers 44 are rotated to disengage the receiving elements 46, the upper housing portion 26 can be rotated away from the lower housing portion 28 by the hinge 42 (which can be coupled to both the upper housing portion 26 and the lower housing portion 28).

In some embodiments, the filter vessel 22 can be used in a process or system (not shown). The inlet 30 and the outlet 32 can be connected to process piping so that the inlet 30 can receive unfiltered fluid and the outlet 32 can output filtered fluid. In some embodiments, the inlet 30 and the outlet 32 can be both in-line and along the same elevation (i.e., on the same plane). For example, as shown in FIG. 3, the inlet 30 and the outlet 32 are positioned along the lower housing portion 28 at an equal elevation. This can often minimize the amount of additional process piping necessary to connect to the inlet 30 and the outlet 32. Furthermore, as shown in FIG. 3, the inlet 30 and the outlet 32 can be located along sides of the housing 24, for example rather than along a top and/or bottom of the housing 24. In other embodiments, the inlet 30 and the outlet 32 can be positioned along different elevations to accommodate process-specific piping designs.

Figure 4:
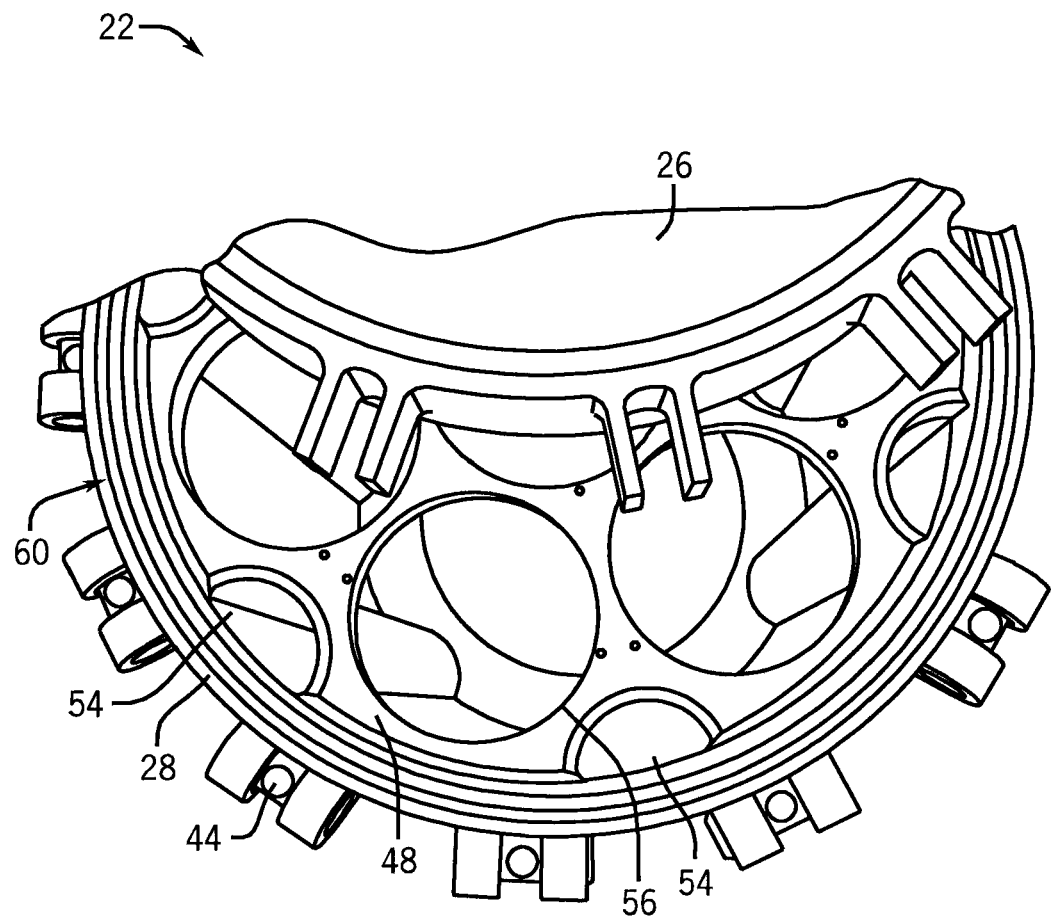
FIG. 4 is a partial top view of the filter vessel of FIG. 3 in an open position.

As shown in FIGS. 4 and 1C, the filter vessel 22 can include a tube sheet 48 separating an inlet chamber 50 from an outlet chamber 52. A plurality of radially-arrayed inlet channels 54 can extend from the inlet manifold 34 (which can be positioned within or adjacent to, but closed off from, the outlet chamber 52) through the tube sheet 48, therefore allowing fluid received by the inlet 30 to travel into the inlet manifold 34, through the inlet channels 54, and into the inlet chamber 50. The tube sheet 48 can also include filter apertures 56 configured to each hold a filter element 58 so that the filter elements 58 are at least partially fixed in place and completely enclosed by the housing 24, as shown in FIG. 1C. As a result, fluid that enters into the inlet chamber 50 can travel into one of the filter elements 58, then across the respective filter element 58 (e.g., across media of the filter element 58) and into the outlet chamber 52. More specifically, fluid can flow through the vessel 22 according to the following described flow path: unfiltered fluid can be received by the inlet 30, flow through the inlet manifold 34, through the inlet channels 54 and into the inlet chamber 50; the fluid can then be filtered as it flows across the filter elements 58 and into the outlet chamber 52; filtered fluid in the outlet chamber 52 can then exit the filter vessel 22 via the outlet 32. In some embodiments, when the outlet 32, the inlet 30, and the inlet manifold 34 are positioned at the same elevation, the outlet 32 can extend through the inlet manifold 34 to reach the outlet chamber 52, as shown in FIG. 1C.

In some embodiments, the inlet channels 54 can be partially cylindrical in shape and can be uniformly spaced in a radial distribution around the circumference of the housing 24. Use of the toroidal inlet manifold 34 allows fluid received through the inlet 30 to be uniformly distributed among the plurality of radially-arrayed inlet channels 54. Further, the radial array of the inlet channels 54 allows incoming fluid to be evenly distributed into the inlet chamber 50, maximizing even distribution of entrained contaminant across the filter elements 58 for optimal filter element use and minimizing flow inhomogeneity (which can lead to inhomogeneous flow distribution), turbulence, high local flow velocities, and potential damage of the filter elements 58. In addition, the radial distribution array allows the inlet channels 54 to be nested within "interstitial space" between the filter elements 58, minimizing filter vessel size and maximizing filter capacity within a given vessel volume. As a result, the toroidal inlet manifold 34 and radially-arrayed inlet channels 54 allow for a minimal vessel diameter and a maximum filter element capacity.

In some embodiments, the filter elements 58 can be inside-to-outside flowing cartridge-style elements of either cylindrical or tapered design, commonly designed as "bag" filters. In other embodiments, the filter elements 58 can include coreless filters, such as VMAX® and TRIDENT® filter designs, manufactured by Pentair Porous Media, which can improve upon the bag filter design by affording greater capacity, higher working differential pressures, easier element removal, high efficiency seals and more consistent, reliable fluid quality. In yet other embodiments, the filter elements 58 can include filtration schemes using other media, such as leaf type filters (employing either screens, cloth, or diatomaceous earth), stacked disk-type filters, formed-bed filters, and other filter media configurations, as well as those employing backwashable or cleanable media. The filter vessel 22 of the present invention, incorporating the toroidal inlet manifold 34 coupled to a radially-arrayed inlet channels 54, can also employ outside-to-inside flowing filter cartridges in some embodiments.

FIG. 5 illustrates example relative arrangements of filter elements 58 and radially-distributed inlet channels 54 of filter vessels 22 of some embodiments. The filter vessels 22 shown in FIG. 5 vary in diameter to accommodate between three and twenty-six filter elements. In particular, these filter vessel configurations can include diameters between about 18 inches and about 48 inches, affording 3, 7, 9, 11, 14, 19, and 26 filter elements 58. In comparison, FIG. 6 illustrates filter elements 20 and conventional inlet configurations of filter vessels 10 (with in-line inlet and outlet nozzles located in same plane, as shown in FIG. 1A) utilizing 18-inch to 48-inch vessel diameters affording 3, 6, 8, 9, 11, 15, and 24 filter elements 20. As shown in FIG. 6, the conventional inlet nozzle configurations require an inlet pipe 16 occupying some substantial fraction of the vessel cross section, limiting the number of filter elements 20, and consequently the filtration capacity of, the filter vessel 10. Accordingly, the added capacity afforded in a fixed filter vessel diameter is apparent in comparing the vessel cross section provided in the toroidal inlet distribution manifold 34 with radially-distributed inlet channels 54, as shown in FIG. 5, with that of a conventional filter vessel design including in-line inlet and outlet nozzles located in same plane, as shown in FIG. 6. In one specific example, a 32-inch diameter filter vessel 22 of the present invention can accommodate eleven standard #2 bag filters 58, while the conventional filter vessel 10 of FIG. 1A would require a 36-inch diameter filter vessel to accommodate the same number of filter elements 20.

In some embodiments, as shown in FIGS. 4 and 1C, the tube sheet 48 can be positioned within the housing 24 so that it is flush with an open end 60 of the lower housing portion 28, allowing the filter elements 58 to be accessible without placing the body of the operator within the confined space of the filter vessel 22. In addition, the toroidal design of embodiments of the invention also allows for a more compact vessel and lower vessel profile, as shown in the relative size comparisons between FIGS. 1A, 1B, and 1C. The lower vessel profile in a vertical orientation, as well as the flush tube sheet 48, can allow the filter vessel 22 to be accessed without requiring un-safe or un-ergonomic body positions and can allow access to the filter elements 58 from grade. In comparison, conventional vessel designs may require access platforms 19 or ladders to allow personnel to change the filter elements 20, as shown in FIG. 2. This can add both capital costs to projects and requires an additional footprint for the system.

In addition, when vessel diameter is increased in response to the need to filter larger liquid process flows, the size of the inlet nozzle and pipe associated with the vessel must be increased as well. In the conventional filter vessel design employing in-line inlet and outlet nozzles 12, 14 located in same plane, as shown in FIG. 1A, accommodating a larger inlet pipe 16 results in diminished filtration capacity by reducing the possible number of filter elements 20 in the vessel 10. In the conventional filter vessel design employing in-line inlet and outlet nozzles 12, 14 in a separate plane, as shown in FIG. 1B, the increased diameter of the inlet 12 adds additional height to the filter vessel 10 and at the same time results in the filter elements 20 being recessed well within the filter vessel 10, making access difficult and reducing operator safety by requiring vessel entry to access the filters 20 (as shown in FIG. 2). In the filter vessel 22 of some embodiments, an increase in liquid capacity and vessel diameter does not require added height or additional displacement of filter space. Rather, additional inlet channels 54 can be nested between filter elements 58 around the circumference of the filter vessel 22.

The filter vessel 22, as shown in FIGS. 1C, 3, and 4, overcomes many of the limitations of existing filter vessel designs (such as those shown in FIGS. 1A and 1B). As described above, the torus design of the filter vessel 22 allows the toroidal inlet manifold 34 to circumscribe the entire housing 24, allowing multiple radially arrayed inlet channels 54 which can be interleaved within an optimal filter element configuration. The arrayed inlet channels 54 do not require the sacrifice of any filter elements 58, unlike conventional designs which displace at least one filter element 58 due to space required for an inlet pipe. The radial inlet channels 54 thus increase the filtration capacity achievable within a given filter vessel 22. The radial array of inlet channels 54 also allows uniform dispersion of the inlet flow uniformly about the vessel 22, minimizing the potential for uneven flow or contaminant distribution and minimizing the potential for high velocities within the vessel 22, which may damage filter elements 58. In addition, the toroidal design of embodiments of the invention also allows the flexibility to orient the inlet and outlet nozzles 30, 32 at virtually any radial angle relative to each other within the same plane, or can allow multiple inlets 30 or outlets 32 within the same plane. This affords the potential to make very compact, arrayed filter vessel systems.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A filter vessel comprising:
   a housing including an inlet and an outlet;
   a toroidal-shaped inlet manifold in fluid communication with the inlet and positioned along a circumference of the housing, the outlet extending through the toroidal-shaped inlet manifold and into an outlet chamber, and wherein portions of the toroidal-shaped inlet manifold extend above and below the outlet; and
   a plurality of inlet channels in fluid communication with the toroidal-shaped inlet manifold.

2. The filter vessel of claim 1, wherein the housing is configured to enclose at least one filter element.

3. The filter vessel of claim 2 and further comprising a tube sheet positioned within the housing to fix at least a portion of the at least one filter element in place and to separate the plurality of inlet channels from the outlet.

4. The filter vessel of claim 3, wherein the plurality of inlet channels are in fluid communication with an inlet chamber, and the outlet is in fluid communication within an outlet chamber, wherein the inlet chamber and the outlet chamber are separated by the tube sheet.

5. The filter vessel of claim 1, wherein the housing includes a lower housing portion releasably coupled to an upper housing portion.

6. The filter vessel of claim 5 and further comprising locking elements that releasable couple together the lower housing portion and the upper housing portion.

7. The filter vessel of claim 5 and further comprising a hinge coupled to the lower housing portion and the upper housing portion and configured to move the upper housing portion relative to the lower housing portion.

8. The filter vessel of claim 5, wherein the inlet and the outlet are positioned along the lower housing portion.

9. The filter vessel of claim 1, wherein the inlet and the outlet are positioned at an equal elevation.

10. The filter vessel of claim 1 and further comprising a base.

11. The filter vessel of claim 1 and further comprising a drain plug.

12. A filter vessel comprising:
a housing including an inlet and an outlet;
a toroidal-shaped inlet manifold in fluid communication with the inlet and positioned along a circumference of the housing;
a tube sheet positioned within the housing and separating an inlet chamber from an outlet chamber, the outlet extending through the toroidal-shaped inlet manifold and into the outlet chamber;
a plurality of inlet channels in fluid communication with the toroidal-shaped inlet manifold and the inlet chamber to disperse fluid, received by the toroidal-shaped inlet manifold from the inlet, substantially uniformly into the inlet chamber; and
a plurality of filter elements extending through the tube sheet and providing a path for the fluid dispersed into the inlet chamber across at least one of the plurality of filter elements and into the outlet chamber.

13. The filter vessel of claim 12, wherein the plurality of inlet channels are uniformly spaced in a radial distribution around the circumference of the housing.

14. The filter vessel of claim 12, wherein the plurality of filter elements are one of bag filters and coreless filter elements.

15. The filter vessel of claim 12, wherein the plurality of filter elements are one of leaf-type filter cartridges, stacked disk-type filter cartridges, and formed bed-type filter cartridges.

16. The filter vessel of claim 12, wherein the inlet and the outlet are positioned at an equal elevation.

17. The filter vessel of claim 12, wherein the housing includes an upper housing portion releasable coupled to a lower housing portion, wherein the tube sheet is positioned to be flush with an open end of the lower housing portion.

18. The filter vessel of claim 12, wherein the plurality of filter elements includes between three filter elements and twenty six filter elements.

19. The filter vessel of claim 12, wherein the plurality of inlet channels are partially cylindrical in shape.

* * * * *